July 16, 1935.  R. BURRUS ET AL  2,008,637
FARROWING HOUSE FOR ANIMALS
Filed March 13, 1934  3 Sheets-Sheet 3
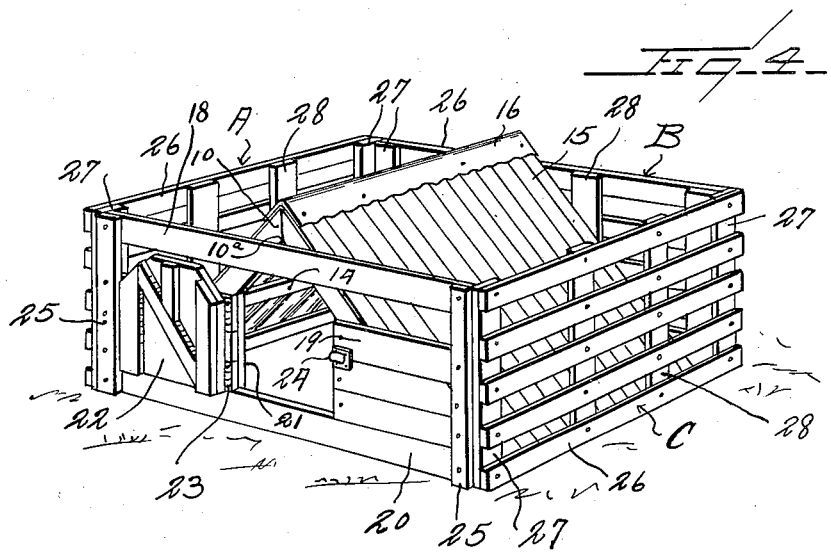
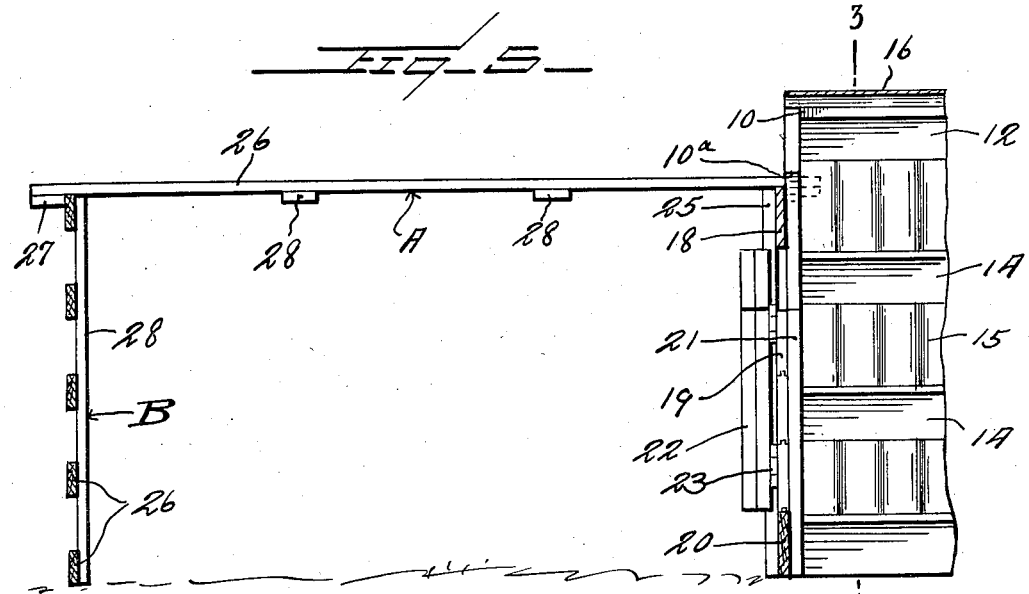
Inventors
R. Burrus
W. Burrus
By Watson E. Coleman
Attorney Patented July 16, 1935

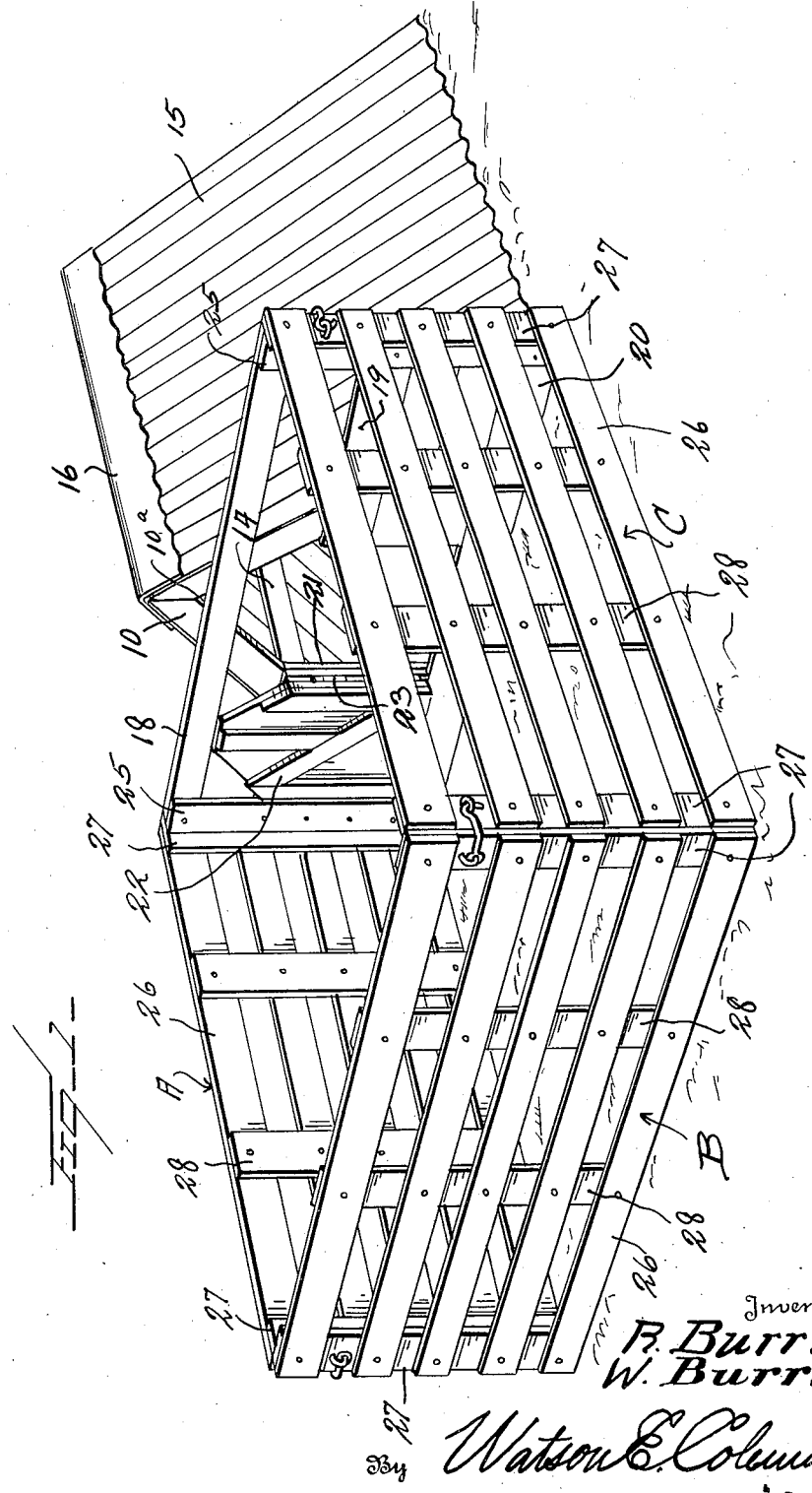

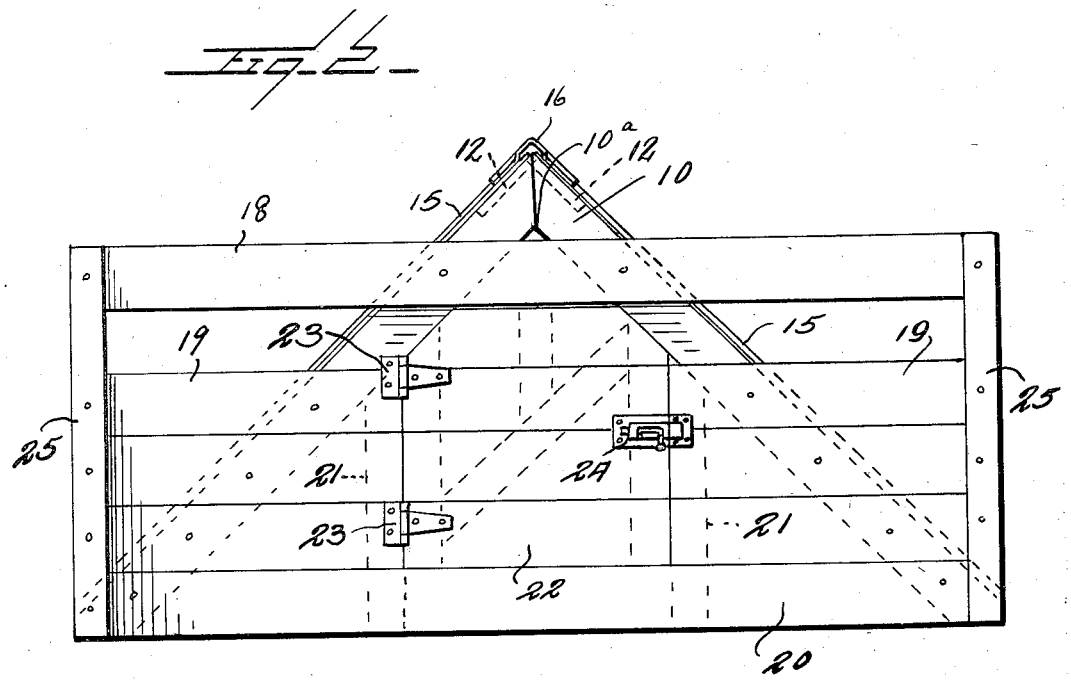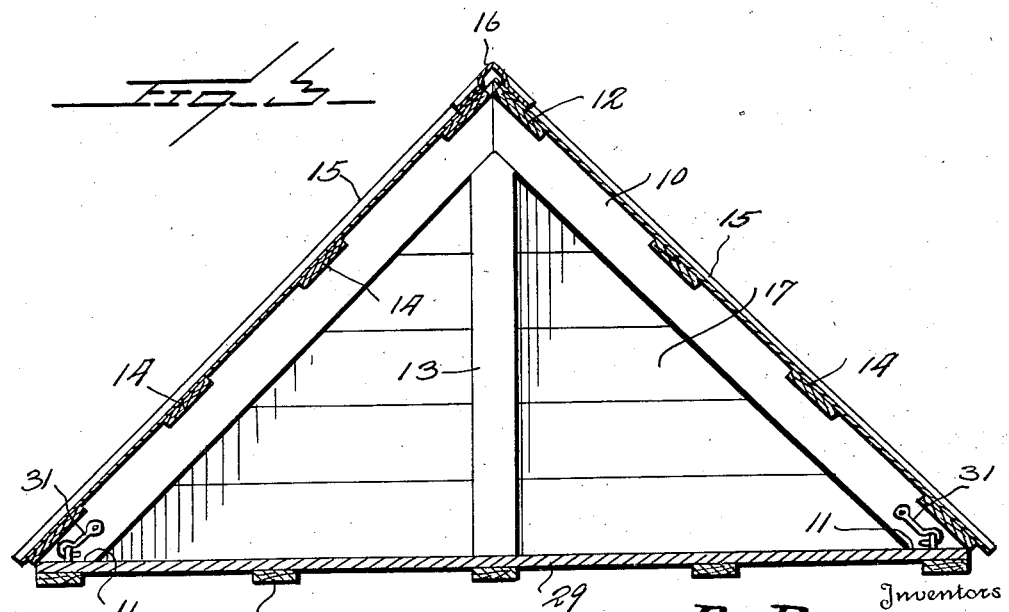

2,008,637

UNITED STATES PATENT OFFICE 2,008,637

FARROWING HOUSE FOR ANIMALS

Roy Burrus and Wilbur Burrus, Arenzville, Ill.

Application March 13, 1934, Serial No. 715,347

1 Claim. (Cl. 119—16)

This invention relates to a farrowing house or pen for animals and particularly for pigs and the general object of this invention is to provide a farrowing house of a very simple construction but in which the roof is given double slant which is particularly valuable in protecting the young pigs, the house having a removable or detachable floor so that it may be readily cleaned at any time.

A further object of the invention is to provide in connection with a house of the character described a series of sections which are capable of detachable engagement with each other and with laterally extending portions of the front of the house so as to provide either an enclosure or yard into which the house opens or an enclosure closely surrounding the house which may be filled with straw during winter to keep the house warm or which may be so arranged as to provide a shelter in front of the house which will protect the pigs from sun in warm weather.

Other objects will appear in the course of the following description.

Our invention is illustrated in the accompanying drawings, wherein:—

Figure 1 is a perspective view of our improved farrowing house with one arrangement of the fence panels thereof;

Figure 2 is a front elevation of the house alone;

Figure 3 is a transverse sectional view of the house on the line 3—3 of Figure 5;

Figure 4 is a perspective view showing another arrangement of the house and the fence panels;

Figure 5 is a longitudinal sectional view showing the front portion of the house and the fence panels arranged to form a sun shelter.

Referring to these drawings, it will be seen that the house itself consists of a supporting frame including a plurality of upwardly and centrally inclined rafters designated 10, these rafters meeting at the apex of the roof in an obvious manner and having their lower ends cut off so as to lie flat against the ground or against a floor as at 11.

A ridge pole 12 which may be composed of two longitudinally extending planks nailed together and fitting over the rafters is disposed at the apex of the roof, the rear rafters being supported by a vertical element 13. The rafters are connected by planks 14 disposed at intervals along the rafters and extending from front to rear and over these planks is disposed the galvanized sheathing 15 preferably corrugated with the corrugations extending downward, the sheathing extending downward nearly to the lower ends of the rafters. A ridge cap 16 is disposed over the upper mating ends of the sheathing. The house so formed is rectangular in plan.

The rear of the house is closed by the tongue and groove planks 17. The front of the house is formed by a transversely extending plank 18 having a length equal to the full width of the house or it may have a slightly greater length and a series of short planks 19, preferably tongue and groove boards, which are supported in spaced relation to each other upon a lower plank 20 of the same length as the plank 18. These planks 18, 19 and 20 may be nailed to the adjacent rafters 10 and to vertical members 21 extending downward from the rafters to the lowermost plank 20, these vertical members defining a door opening which may be closed by a door 22 hinged at 23 to one of the elements 21, this door being provided with a bolt 24 of any suitable character whereby it may be held closed, when desired.

There is preferably a space left between the uppermost boards 19 and the board 18. The ends of all of the boards 18, 19 and 20 are connected by uprights 25. The inside face of the door 22 is braced in any suitable manner.

Coacting with the house constructed as described, are a plurality of fence sections A, B and C all of the same general character and each section being formed of a series of longitudinally extending planks 26 spaced from each other, end uprights 27 and intermediate uprights 28. These several sections A, B and C are adapted to be disposed as illustrated in Figure 1 to form a square enclosure or yard in front of the house, the sections A and C being abutted against the laterally extended front section of the house and the sections being connected to each other and to the ends of this laterally extending front of the house by any suitable means such as hooks and eyes. When the sections are arranged as illustrated in Figure 1, an enclosure is formed in front of the house into which the door opening of the house opens so that the pigs may have free entrance into or exit from the house into the enclosure.

In the winter when the air is cold, the fence sections are disposed to surround the house as shown in Figure 4 and straw or other material is placed within the fence and entirely or partially over the roof of the house, thus keeping the pigs warm. In summer when it is necessary to shield the little pigs from the rays of the sun, the sections may be arranged as shown in Figure 5 wherein the section B is arranged parallel to but spaced from the front of the house and the sections A and C are disposed to rest upon the section B and upon the laterally projecting portions of the plank 18. In this case the vertical members of the sections A and C extend over the planks 18 and the uppermost planks of the section B and thus act to hold the sections from any tipping movement. Straw may be placed, under these circumstances, upon the sections A and C so as to form a shelter from the sun.

Obviously the sections A, B and C may be removed entirely if desired.

It will be noted that the lower ends of the rafters 10 rest upon the floor 29 which is supported by longitudinal sills 30, two of these sills coming beneath the ends of the rafters. The floor is detachably held to the rafters by the hooks and eyes 31. Thus when it is desired to clean the floor, the floor is unhooked from the superstructure and the superstructure lifted off the floor.

We have provided a structure which is very light, may be easily handled and which, because of its form, is particularly adapted for young pigs. It may be readily protected from the heat of the sun, if desired, or may be banked by surrounding the house with the fence sections and filling the space within the fence sections with straw. It may be readily converted, therefore, from a winter house to a summer house and adjusted to suit all seasons and all conditions of the pigs.

The triangular shape of the house in cross section is particularly adapted for the raising of young pigs because the small pigs may escape from being trampled on or smothered by the sow by moving into the lateral portions of the house where the height is too low to accommodate the sow. Thus this low pitched roof extending down to the floor provides a pig guard space for the young pigs. The metallic sheathing extends to the floor but ventilation is secured through the opening 10a and through the open door except in extremely cold weather when this door is closed. The opening 10a provides a vent about three square inches which is ample for ventilation purposes.

We claim:—

A farrowing pen for pigs having a roof inclined downwardly and outwardly from the middle of the pen and extending to the ground, the pen being closed at one end, the front of the pen being extended in opposite directions beyond the roof and having a door opening therein, the ends of the extension having uprights, three fence panels having a height nearly equal to that of the pen and having end uprights, the fence panels being adapted to be disposed in connection with the extended front of the pen to surround the pen for the purpose of filling the space between the panels and the roof with protective material, the said panels being adapted to inclose a space in front of the house and into which space the door opens, and means for detachably connecting the uprights of the panels to each other and for detachably connecting the uprights of certain panels to the uprights of the ends of the extended front of the house.

ROY BURRUS.
WILBUR BURRUS.